US 8,148,021 B2

(12) United States Patent
McLean et al.

(10) Patent No.: US 8,148,021 B2
(45) Date of Patent: Apr. 3, 2012

(54) METHODS AND APPARATUS FOR REFUELING REVERSIBLE HYDROGEN-STORAGE SYSTEMS

(75) Inventors: Gerard Francis McLean, West Vancouver (CA); Joerg Zimmermann, Vancouver (CA); Duhane Lam, Vancouver (CA)

(73) Assignee: Société BIC, Clichy (FR)

( * ) Notice: Subject to any disclaimer, the term of this patent is extended or adjusted under 35 U.S.C. 154(b) by 1442 days.

(21) Appl. No.: 11/535,050

(22) Filed: Sep. 25, 2006

(65) Prior Publication Data

US 2008/0038617 A1 Feb. 14, 2008

Related U.S. Application Data

(60) Provisional application No. 60/719,603, filed on Sep. 23, 2005.

(51) Int. Cl.
*H01M 8/04* (2006.01)
*H01M 8/06* (2006.01)
*B67D 7/00* (2010.01)

(52) U.S. Cl. ............ 429/408; 429/433; 429/443; 222/3

(58) Field of Classification Search ........................ None
See application file for complete search history.

(56) References Cited

U.S. PATENT DOCUMENTS

| 6,733,741 B2 * | 5/2004 | Nakamura ................. 423/658.3 |
| 6,918,430 B2 | 7/2005 | Myasnikov et al. |
| 2003/0162059 A1 | 8/2003 | Gelsey |
| 2004/0076561 A1 * | 4/2004 | Kajiura et al. ................ 422/187 |
| 2007/0116623 A1 * | 5/2007 | Chen et al. .................. 423/351 |

FOREIGN PATENT DOCUMENTS

JP 2000-017408 * 1/2000

* cited by examiner

*Primary Examiner* — Barbara Gilliam
*Assistant Examiner* — Angela Martin
(74) *Attorney, Agent, or Firm* — Schwegman, Lundberg & Woessner, P.A.

(57) ABSTRACT

A method for refilling a hydrogen reservoir comprising a first hydrogen-storing material comprises establishing a fluid connection between the hydrogen reservoir and a cartridge containing a second hydrogen-storing material. The second hydrogen-storing material releases hydrogen at a pressure sufficient to charge the first hydrogen-storing material. Some embodiments involve heating the second hydrogen-storing material and/or allowing heat to flow between the first and second hydrogen-storing materials.

19 Claims, 8 Drawing Sheets

METHODS AND APPARATUS FOR REFUELING REVERSIBLE HYDROGEN-STORAGE SYSTEMS

CROSS-REFERENCE TO RELATED APPLICATION

This application claims the benefit under 35 U.S.C. §119 of U.S. application No. 60/719,603 filed on 23 Sep. 2005 and entitled METHOD AND APPARATUS FOR REFUELING REVERSIBLE METAL HYDRIDE HYDROGEN STORAGE SYSTEM, which is hereby incorporated herein by reference.

TECHNICAL FIELD

This invention relates to storing and transferring hydrogen gas. The invention has particular application to storing and transferring hydrogen gas to be used as a fuel for fuel cells.

BACKGROUND

Fuel cells have attractive properties for providing electrical power to portable devices. Some developers of 'micro fuel cell' systems are developing fuel cell systems for portable applications. Many such systems are designed to receive fuel from disposable cartridges. The fuel is fed directly into a fuel cell from a cartridge. The fuel cell converts chemical energy from the fuel into electrical energy. In the process, the fuel is consumed.

Other portable power systems have on-board fuel storage. In these systems an on-board fuel reservoir must be replenished from time to time. Replenishing the fuel reservoir from a stationary source of fuel allows for low-cost replenishment of the fuel reservoir. However, when the portable device is operated remotely from such stationary sources it becomes necessary to provide a portable means for replenishing the fuel reservoir.

Hydrogen can be stored with a high volumetric density of stored energy in hydrogen reservoirs containing hydrogen-storing materials, such as reversible metal hydrides. Such fuel reservoirs can be used to store hydrogen fuel for use in portable devices. However, while hydrogen fuel provides benefits in maximizing the runtime of such devices, there are difficulties with the development of portable refueling cartridges that can be used to replenish such hydrogen reservoirs.

SUMMARY

The term "satellite cartridge" is used herein to refer to a portable vessel that can contain hydrogen for transfer into a hydrogen reservoir of a portable device.

The inventors have recognized that:
  There is a need for satellite cartridges with a high volumetric energy density.
  There is a need for ways to remove heat from hydrogen reservoirs containing hydrogen-storing materials when they are being charged.
  There is a need to regulate the pressure of gas being fed to a hydrogen reservoir comprising a hydrogen-storing material being charged.
  There is a need to maximize safety, minimize hazards, and provide protection from reasonably foreseeable misuse when charging hydrogen reservoirs with hydrogen.

One aspect of the invention provides a method for transferring hydrogen fuel into a hydrogen reservoir comprising a first hydrogen-storing material. The method comprises: providing a satellite cartridge comprising a vessel containing hydrogen gas at a pressure that is at least equal to a charging pressure of the first hydrogen-storing material and a second hydrogen-storing material that is charged with hydrogen; placing the satellite cartridge in fluid communication with the hydrogen reservoir; and, allowing hydrogen to flow from the satellite cartridge into the hydrogen reservoir and combine with the first hydrogen-storing material.

Some embodiments comprise thermally connecting the first and second hydrogen-storing materials and allowing heat to flow from the first hydrogen-storing material to the second hydrogen-storing material while allowing the hydrogen to flow from the satellite cartridge into the hydrogen reservoir.

Another aspect of the invention provides a satellite cartridge which contains hydrogen-storing material such as a metal alloy that captures a relatively high mass of hydrogen in a relatively small volume, absorbs heat when discharging hydrogen, and delivers hydrogen at a pressure suitable for charging on-board hydrogen storage systems.

Another aspect of the invention provides an apparatus comprising the combination of a portable device with a satellite cartridge. The portable device comprises a hydrogen reservoir comprising a first hydrogen-storing material and a fuel cell connected to receive hydrogen from the hydrogen reservoir. The refueling cartridge comprises a second hydrogen-storing material having a plateau (or "discharge") pressure at least equal to a charging pressure of the first hydrogen-storing material (e.g. a pressure at which hydrogen occlusion of the first hydrogen-storing material occurs). The satellite cartridge is in fluid communication with the hydrogen reservoir by way of a detachable fluid coupling.

Further aspects of the invention and features of various embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention may be applied to supply hydrogen to hydrogen reservoirs that contain hydrogen-storing materials, such as reversible metal hydrides. Hydrogen can be occluded by the hydrogen-storing material and later released for use as a fuel. The hydrogen-storing material helps to provide a high volumetric energy density (i.e. helps to increase the mass of hydrogen that can be stored in a given volume). The hydrogen reservoir may be on board a portable device that uses hydrogen. For example, the portable device may comprise one or more fuel cells that consume hydrogen. Such on-board hydrogen reservoirs may be integrated with a portable device or may be designed to be removable from the portable device. The hydrogen reservoirs may be refilled at least once.

Such hydrogen reservoirs can be charged with hydrogen by introducing hydrogen at a pressure that is greater than or equal to a minimum charging pressure. At the charging pressures, the hydrogen-storing material occludes the hydrogen. The mechanism for occlusion may involve absorption, adsorption, or any other reversible combination of hydrogen with the hydrogen-storing material. "Charging pressure" is used herein to mean a pressure at which a hydrogen-storing material occludes or otherwise takes up hydrogen.

After the hydrogen-storing material has been charged with hydrogen, the hydrogen-storing material will release hydrogen to maintain a plateau pressure. At the plateau pressure there is an equilibrium between hydrogen in the gaseous phase and hydrogen associated with the hydrogen-storing material. The plateau pressure is typically less than the minimum charging pressure and significantly less than the optimum charging pressure. "Plateau pressure" is used herein to refer to the pressure against which a hydrogen-storing material can release hydrogen by desorption or otherwise.

Figure 4:
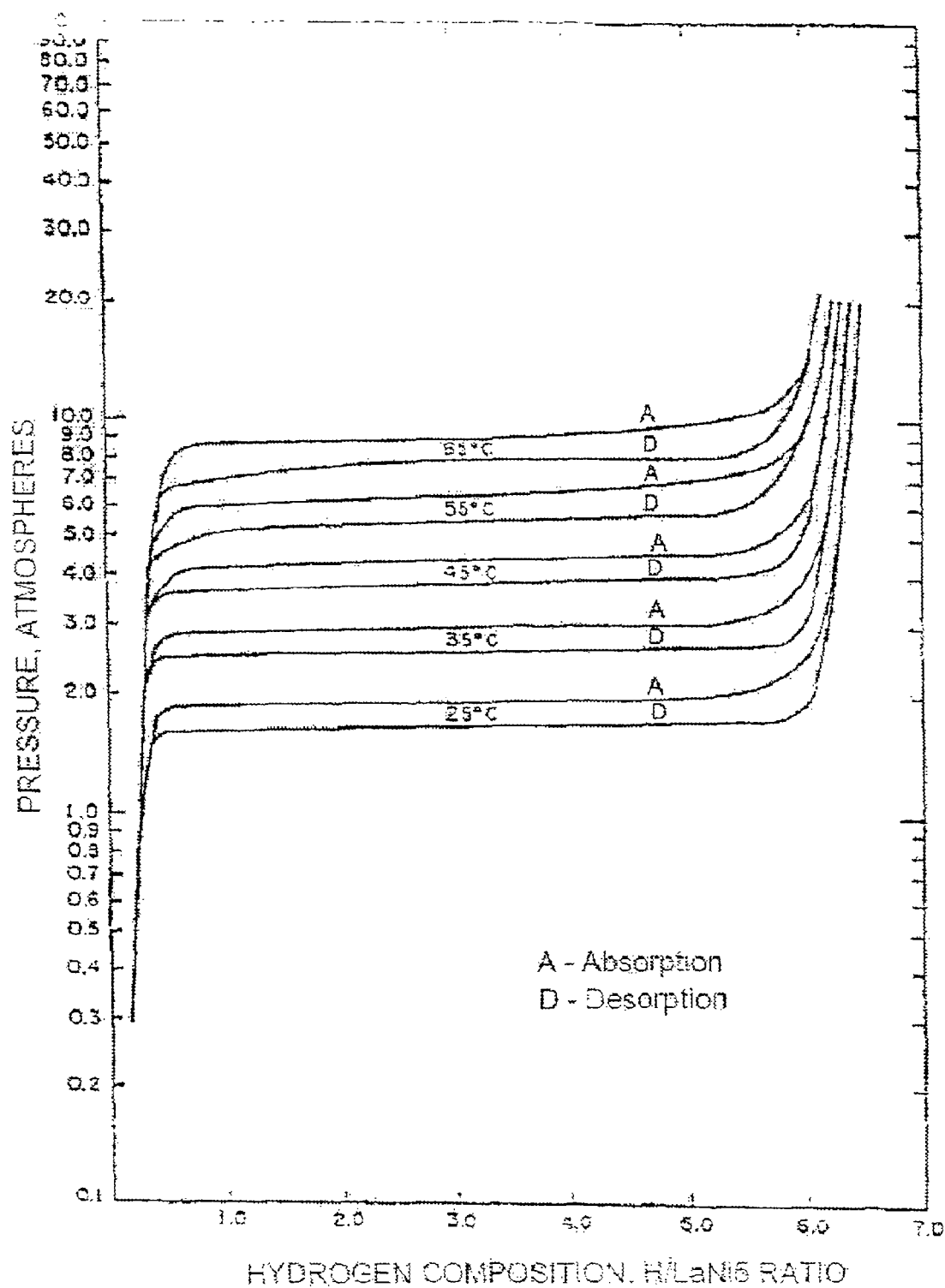
FIG. 4 shows curves of hydrogen content of a typical metal hydride material as a function of pressure for various temperatures.

FIG. 4 shows curves of hydrogen content of a typical metal hydride material as a function of pressure for various temperatures. In FIG. 4, it can be seen that, for a given temperature, the pressure required to increase the hydrogen content of a metal hydride material (e.g. the pressure required to cause hydrogen occlusion) is greater than the pressure at which hydrogen is released from the metal hydride material (e.g. the pressure at which desorption occurs).

It is desirable to provide a portable means of refilling hydrogen reservoirs with hydrogen. It is particularly desirable to provide a way to transfer hydrogen into hydrogen reservoirs associated with portable fuel-cell-powered devices. A hydrogen reservoir comprising a hydrogen-storing material can be refilled from any of various sources of hydrogen at a pressure greater than or equal to the charging pressure. For instance, a tank containing compressed hydrogen can be used to refuel devices employing hydride storage systems if the hydrogen can be provided from the tank at a pressure of at least the minimum charging pressure. However, the low volumetric storage density of compressed hydrogen diminishes the convenience and effectiveness of portable compressed hydrogen tanks or cartridges.

One aspect of the invention relates to methods and apparatus for adding hydrogen to a hydrogen reservoir containing a hydrogen-storing material. In some embodiments, an on-board hydrogen reservoir which contains a first hydrogen-storing material receives hydrogen from a satellite cartridge which contains hydrogen associated with a second hydrogen-storing material. In some embodiments, the first and second hydrogen-storing materials are the same and in others they are different.

Employing a reversible hydrogen-storing material such as a suitable metal hydride for hydrogen storage within a satellite refueling cartridge greatly increases the volumetric and/or gravimetric storage capacity of the cartridge and consequently increases its convenience and effectiveness as compared to refueling cartridges containing only compressed hydrogen gas.

In a number of the example embodiments described herein, metal hydrides in satellite cartridges are used to supply hydrogen to refuel on-board metal-hydride-based hydrogen reservoirs. The selection of metal hydrides as the hydrogen-storing materials is not mandatory. Either or both of the satellite cartridge and the on-board hydrogen reservoir may contain one or more hydrogen-storing materials in addition to or instead of metal hydrides or metals that form metal hydrides. As new hydrogen-storing materials are developed, new classes of material may be substituted for reversible metal hydrides as the hydrogen-storing material. The invention may be practiced with any suitable hydrogen-storing materials. Examples of suitable hydrogen-storing materials include:
  AB5 alloys such as $LaNi_5$,
  AB alloys such as FeTi,
  AB2 type metal hydride alloys;
  BCC (body-centered cubic) type metal hydride alloys;
  other alloys that are known to occlude and desorb hydrogen,
  suitable zeolites, and
  carbon-based reversible hydrogen-storing materials such as suitable carbon nanotubes, carbon fibres, carbon aerogels, and activated carbon.

Any suitable materials may be used to reversibly store hydrogen so long as they have acceptable pressure/temperature characteristics as do those metal hydrides known to those in the art as being useful for storing hydrogen.

Some examples of technologies that may be applied in a satellite fuel cartridge or in an on-board hydrogen reservoir are described in:
  U.S. patent application Ser. No. 11/379,970 entitled "Composite hydrogen storage material and methods related thereto", filed Apr. 24, 2006;
  U.S. patent application Ser. No. 11/473,591 entitled "Fluid enclosure and methods related thereto", filed Jun. 23, 2006; and,
  U.S. patent application No. 60/757,782 entitled "Cellular reservoir and methods related thereto", filed Jan. 9, 2006
all of which are hereby incorporated by reference herein.

A method and an apparatus for fueling and refueling a hydrogen reservoir which supplies hydrogen to a fuel cell in a portable fuel-cell-powered device, comprises transferring hydrogen into the hydrogen reservoir from a satellite cartridge that contains hydrogen that is associated with a reversible metal hydride or other suitable hydrogen-storing material.

Figure 1:
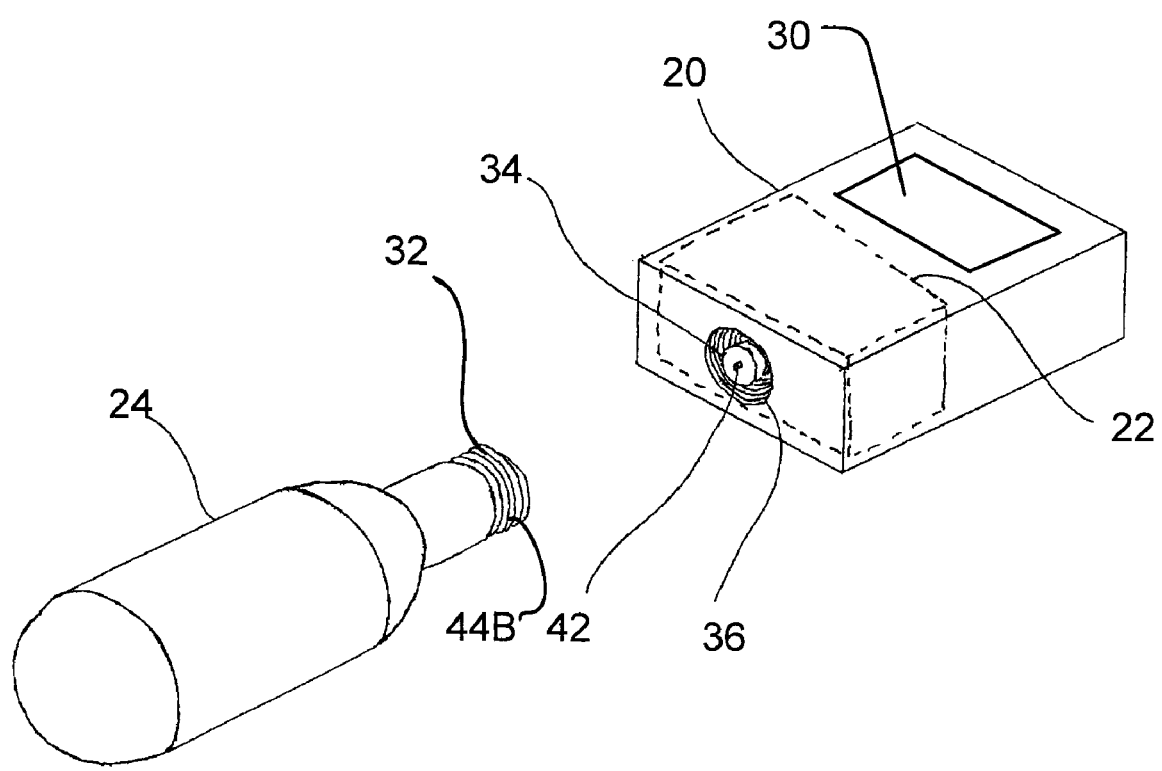
FIG. 1 shows a satellite cartridge containing a metal hydride and a fuel cell device comprising a hydrogen reservoir according to the present invention.
Figure 2:
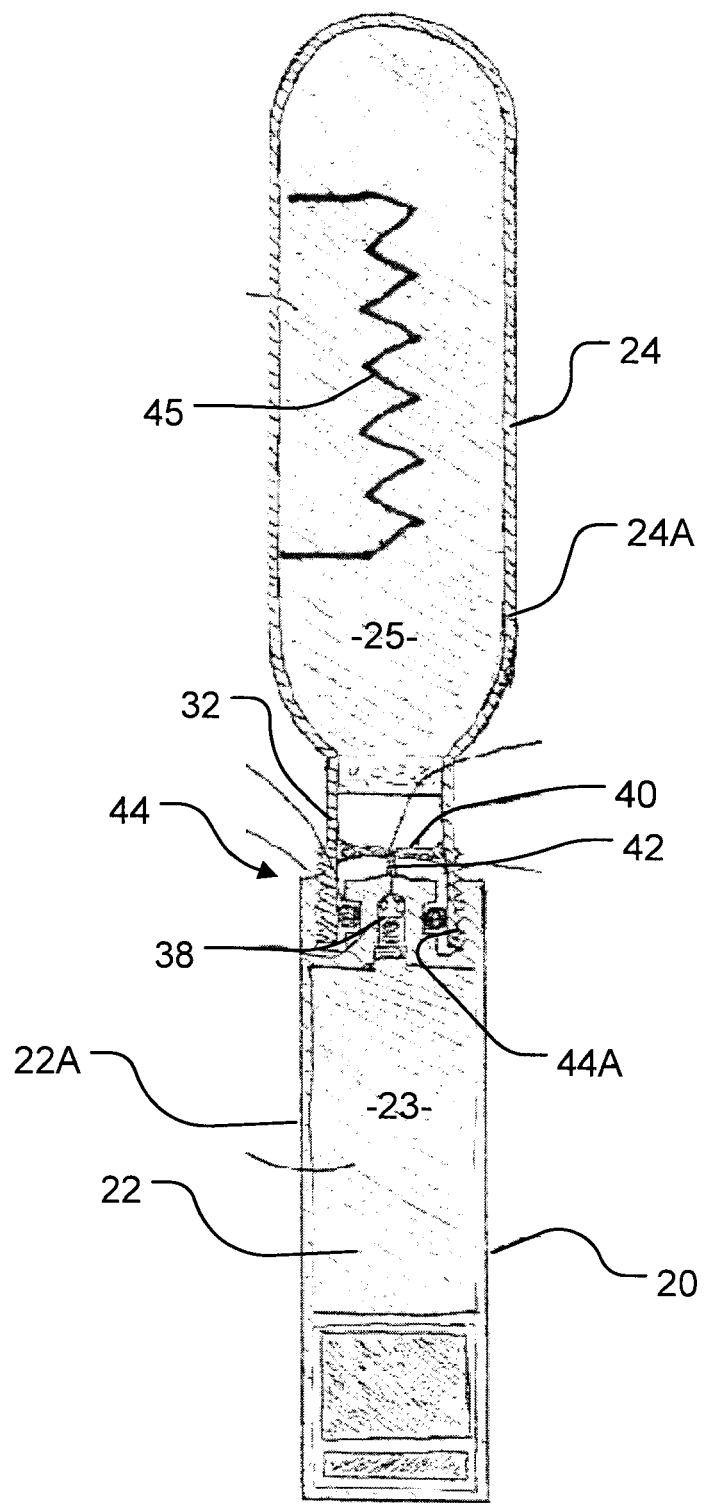
FIG. 2 shows a satellite cartridge containing metal hydride connected to a portable fuel cell device comprising a hydrogen reservoir during replenishment of the hydrogen reservoir in the portable device.

FIG. 1 shows a portable fuel-cell-powered device 20 comprising an on-board hydrogen reservoir 22. A satellite cartridge 24 is not yet connected to supply hydrogen to hydrogen reservoir 22. FIG. 2 is a cutaway view of the components shown in FIG. 1 in a connected configuration. On-board hydrogen reservoir 22 comprises a vessel 22A that contains a first hydrogen-storing material 23 that can hold hydrogen and release the hydrogen to supply fuel to a fuel cell or fuel cells 30. Satellite cartridge 24 comprises a vessel 24A that contains a second hydrogen-storing material 25 that holds hydrogen and can release the hydrogen to replenish hydrogen reservoir 22.

Fuel-cell-powered device 20 can be refueled by placing satellite cartridge 24 in fluid communication with hydrogen reservoir 22 so that hydrogen gas can flow from satellite cartridge 24 into hydrogen reservoir 22. In the illustrated embodiment, this fluid connection is achieved by inserting a connector 32 of satellite cartridge 24 into a refueling port 34 of device 20 to create a fluid interconnect.

In the illustrated embodiment, the interconnect comprises a seal 36 (which may comprise an o-ring, for example) which seals against connector 32 to prevent the escape of hydrogen gas during refueling. A one-way charging valve 38 is disposed in device 20 between refueling port 34 and hydrogen reservoir 22. Charging valve 38 permits hydrogen to flow from satellite cartridge 24 to hydrogen reservoir 22 when satellite cartridge 24 is coupled to device 20 but prevents the discharge of hydrogen via refueling port 34 when satellite cartridge 22 is not connected.

In the illustrated embodiment, satellite cartridge 24 comprises a closure mechanism 40 (see FIG. 2) that prevents hydrogen from escaping from satellite cartridge 24 when satellite cartridge 24 is not coupled to hydrogen reservoir 22 but can be opened to allow hydrogen to flow from satellite cartridge 24 into hydrogen reservoir 24 when satellite cartridge 24 is coupled to hydrogen reservoir 22. Closure mechanism 40 may comprise a valve, septum, rupture disc or the like that can be opened to allow the passage of hydrogen. If satellite cartridge 24 is not intended to be refilled and is not intended to be used to refill hydrogen reservoir 22 multiple times then it is not necessary that it be possible to close closure mechanism 40 after it has been opened. In some embodiments closure mechanism 40 is manually operable. In some embodiments, closure mechanism 40 is opened automatically by the act of coupling satellite cartridge 24 to hydrogen reservoir 22.

In the embodiment illustrated in FIG. 2, closure mechanism 40 is opened by an actuating mechanism 42. The actuating mechanism may be associated with refueling port 34. The actuating mechanism may comprise a pin, or other member that mechanically operates closure mechanism 40 while satellite cartridge 24 is being coupled to hydrogen reservoir 22 and after a seal has been made between pot 34 and connector 32.

For safety, it is generally desirable that, during refueling, satellite cartridge 24 be supported relative to portable device 20 or hydrogen reservoir 22 such that hydrogen will not leak if the combined satellite cartridge 24 and hydrogen reservoir 22 is accidentally bumped or jarred. In the illustrated embodiment, a holding mechanism 44 is disposed on satellite cartridge 24 and provides a rigid engagement between satellite cartridge 24 and device 20. Holding mechanism 44 may comprise a connection to refueling port 34, an exterior surface of device 20 or hydrogen reservoir 22, or any other mechanism that holds satellite cartridge 24 firmly relative to device 20 or hydrogen reservoir 22 during refueling. In the illustrated embodiment, the holding mechanism comprises threads 44A on port 34 that engage threads 44B on satellite cartridge 24. Other holding mechanisms may comprise bayonet connections, friction fits, adhesives, magnetic couplings, or any of numerous other suitable designs.

Figure 3:
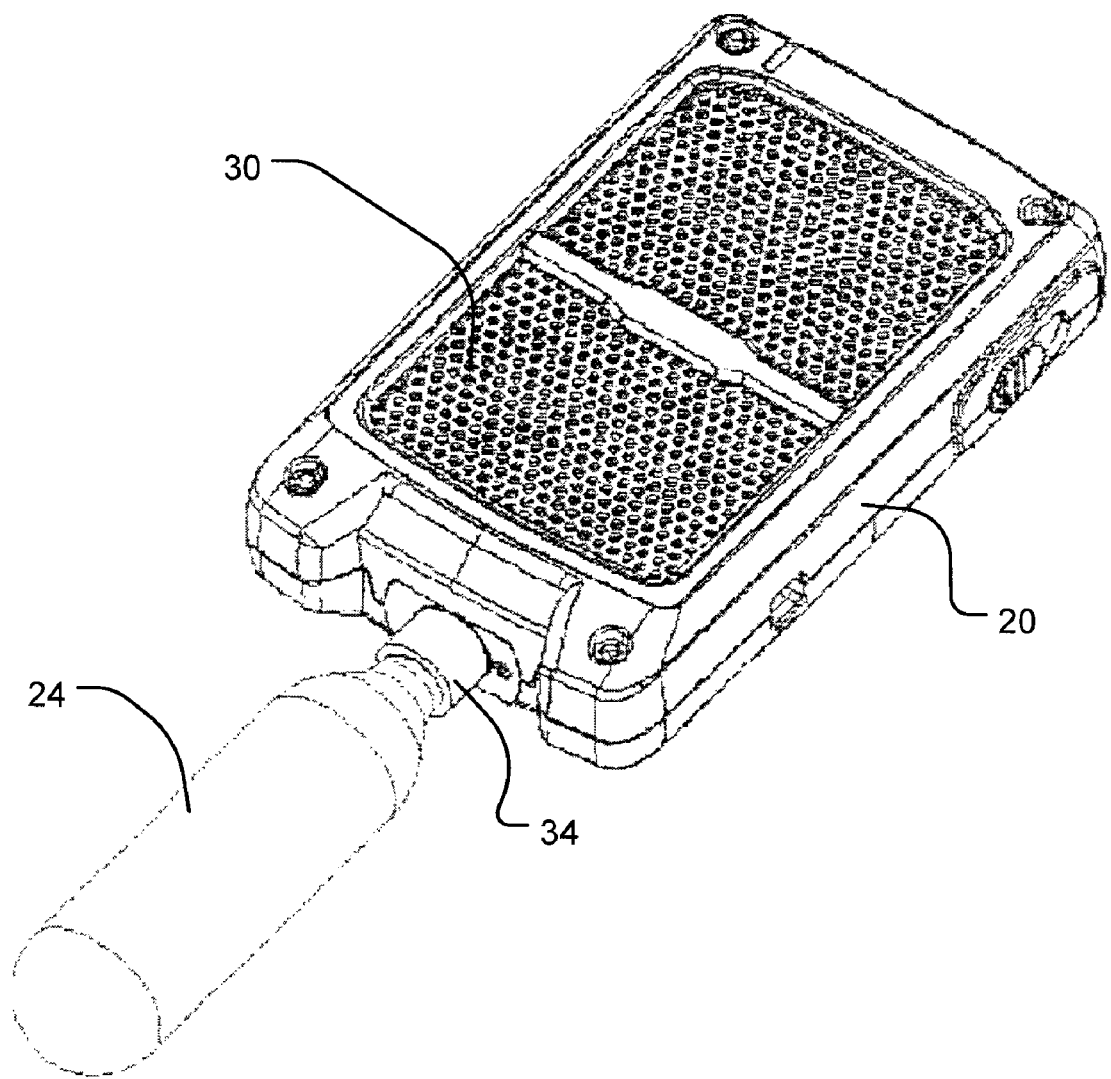
FIG. 3 depicts one embodiment of a satellite refueling cartridge connected to a portable fuel-cell-powered device according to an embodiment of the invention.

FIG. 3 shows a satellite cartridge coupled to a portable fuel-cell power source. An example of such a power source is described in the co-pending United States patent application entitled Portable fuel cell power source filed on 25 Sep. 2006, which is hereby incorporated by reference herein.

Satellite cartridge 24 as shown in FIG. 1 has a single connector 32 for establishing a fluid coupling to hydrogen reservoir 22. Satellite cartridge 24 may optionally comprise one or more of: a separate refilling port, a safety relief device, a pressure relief device (either pressure or heat activated), or combinations thereof.

First and second hydrogen-storing materials 23 and 25 may be selected based upon a wide range of factors including:
plateau pressure,
charging pressure,
potential hydrogen storage density,
inflammability of the hydrogen-storing material,
toxicity of the hydrogen-storing material,
whether or not disposal of the hydrogen-storing material could be bad for the environment,
cost,
and the like.

Typical available metal hydrides based on AB5, AB2, AB or BCC structures can all be employed as hydrogen-storing materials within satellite cartridge 24 or hydrogen reservoir 22, the selection being based on the desired combination of the properties mentioned above.

In some embodiments, the first and second hydrogen-storing materials are selected so that their properties are related in a way that facilitates the transfer of hydrogen from satellite cartridge 24 into hydrogen reservoir 22. In such embodiments the first and second hydrogen-storing materials may have different compositions or alloy structures. More specifically, in such embodiments, the second hydrogen-storing material 25 (e.g. the metal hydride or other hydrogen-storing material contained in satellite cartridge 24) is chosen to have a plateau pressure that is greater than or equal to the charging pressure of first hydrogen-storing material 23 (e.g. the metal hydride or other hydrogen-storing material contained in hydrogen store 22).

Figure 4A:
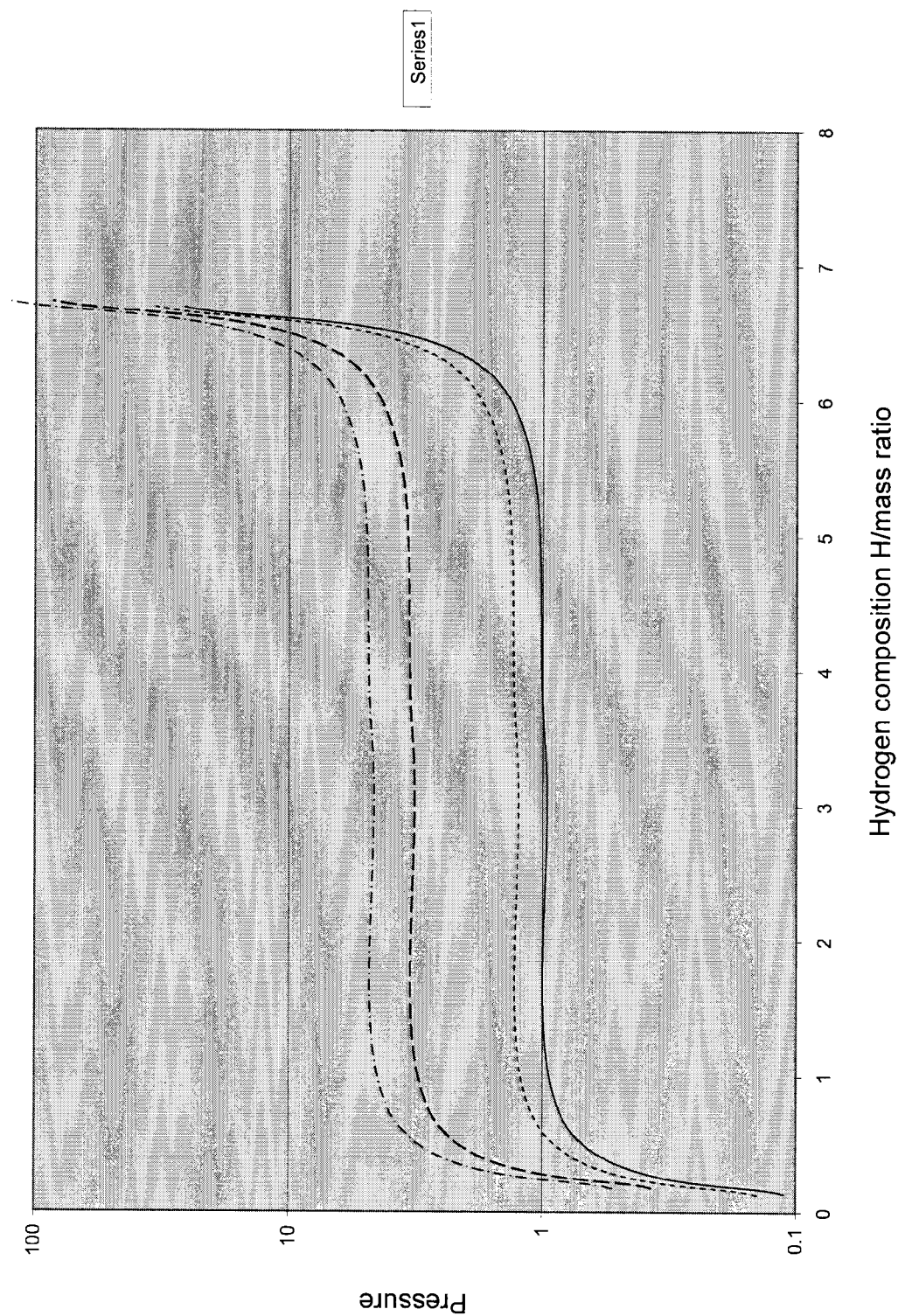
FIG. 4A is a plot showing sets of isothermal pressure-composition curves for two metal hydrides that could be used as first- and second-hydrogen-storing materials in an example embodiment of the invention; and, FIGS. 5 and 5A show partially schematically apparatus comprising a satellite cartridge having a flattened prismatic form factor.

FIG. 4A is a plot showing sets of isothermal pressure-composition curves for two metal hydrides: alloy A and alloy B. The curves in FIG. 4A are typical curves provided for exemplary purposes only and are not derived from experimental data for any specific metal hydrides. At any given temperature the plateau (desorption) pressure for alloy A is greater than the charging (occlusion) pressure for alloy B. When second hydrogen-storing material 25 comprises alloy A and is charged with hydrogen, first hydrogen-storing material 23 comprises alloy B and is not fully charged with hydrogen, and satellite cartridge 24 is in fluid communication with hydrogen reservoir 22 then hydrogen will be released from alloy A, travel from satellite cartridge 24 to hydrogen reservoir 22 and combine with alloy B. The transfer of hydrogen will continue until: alloy A is substantially empty of hydrogen, alloy B is substantially charged with hydrogen, an equilibrium state is reached or some combination thereof occurs.

One feature of such embodiments is that overfilling of hydrogen reservoir 22 cannot occur. If first hydrogen-storing material 23 becomes fully charged with hydrogen before second hydrogen-storing material 25 has released all of its hydrogen, then the pressure within the system (comprising satellite cartridge 24, hydrogen reservoir 22, and any conduits, fittings etc. making up the fluid connection that joins them) will rise to marginally above the plateau pressure of second hydrogen-storing material 25 at which point it will reach an equilibrium. After this equilibrium is reached, the transfer of hydrogen will cease. This self-regulating coupling between the first and second hydrogen-storing materials makes it impossible to 'over-charge' hydrogen reservoir 22.

It is not necessary for hydrogen reservoir 22 to be completely depleted before its supply of hydrogen is replenished from satellite cartridge 24. If first hydrogen-storing material 23 is partially depleted then it can be topped up by placing it in fluid communication with a satellite cartridge 24 in which second hydrogen-storing material 25 is not depleted of hydrogen. Thus, a user can take advantage of opportunities to refuel a portable device that may arise before a hydrogen reservoir of the portable device has become depleted. The self-regulating coupling between the first and second hydrogen-storing materials and allows multiple connect-disconnect cycling of satellite cartridge 24 with little loss of fuel (as long as sealing mechanism 40 in satellite cartridge 24 can be re-sealed after it has been opened).

First hydrogen-storing material 23 (for example, a metal hydride in on-board hydrogen reservoir 22) is preferably selected such that its plateau pressure is a pressure at which it is suitable to supply hydrogen to fuel cells 30. In such embodiments, on-board hydrogen reservoir 22 may be connected directly to fuel cells 30. In alternative embodiments a pressure regulator or flow limiter 33 (See FIG. 6) may be provided between hydrogen reservoir 22 and fuel cells 30 so that the hydrogen is not supplied to fuel cells 30 at an excessive pressure.

As a non-limiting example embodiment, consider the case where satellite cartridge 24 contains a TiFe metal hydride and hydrogen reservoir 22 contains a $LaNi_5$ metal hydride. At room temperature, $LaNi_5$ has a charging (occlusion via absorption) pressure of 1.8 bars absolute while TiFe has a room temperature plateau (desorption) pressure of 4.1 bars absolute. When satellite cartridge 24 is in fluid communication with hydrogen reservoir 22 then hydrogen will flow from satellite cartridge 24 into fuel store 22 until either the TiFe is substantially discharged or the $LaNi_5$ is substantially fully charged.

As illustrated in FIG. 4, the plateau and charging pressures for metal hydrides typically vary with temperature. The plateau and charging pressures for first and second hydrogen-storing materials 23 and 25 preferably have the relationships described above at desired operating temperatures. Since many portable devices operate at room temperature, in certain embodiments the plateau and charging pressures of the first and second hydrogen-storing materials have the relationships described above for temperatures in the range of at least about 15° C. to 30° C. In some embodiments, the relationships hold over a broader temperature range such as at least about −10° C. to 40° C.

As noted above, the plateau pressure of second hydrogen-storing material 25 is generally greater than that of first hydrogen-storing material 23. Consequently, the pressure within hydrogen reservoir 22 is increased while it is coupled to satellite cartridge 24. This can be used to advantage when it is desired to operate device 20 under conditions where the ambient temperature is low. Leaving satellite cartridge 24 connected to hydrogen reservoir 22 raises the pressure within hydrogen reservoir 22 to the plateau pressure of the second hydrogen-storing material 25, which is greater than the plateau pressure of first hydrogen-storing material 23. This extends to lower temperatures the temperature range in which device 20 can be operated.

Some embodiments exploit the fact that the plateau (desorption) pressure of hydrogen in many metal hydrides and other hydrogen-storing materials increases rapidly with temperature. For example, in some cases the desorption pressure can double with each temperature increase of 10° C. Some embodiments include a heater disposed to heat second hydrogen-storing material 25 in satellite cartridge 24 so as to achieve a desorption pressure sufficient to charge first hydrogen-storing material 23 in hydrogen reservoir 22. A heater 45 is shown schematically in FIGS. 2 and 6. Heater 45 may comprise, for example:

an element that is heated electrically;
a member that is heated in some other manner (for example by a catalytic heater); or,
a current source disposed to provide resistive heating of second hydrogen-storing material 25.

Second hydrogen-storing material 22 may have a plateau (desorption) pressure lower than necessary to charge first hydrogen-storing material 23 when it is not heated to an elevated temperature. The pressure within satellite cartridge 24 can be increased by operating heater 45 when it is desired to charge a hydrogen reservoir 22.

Figure 6:
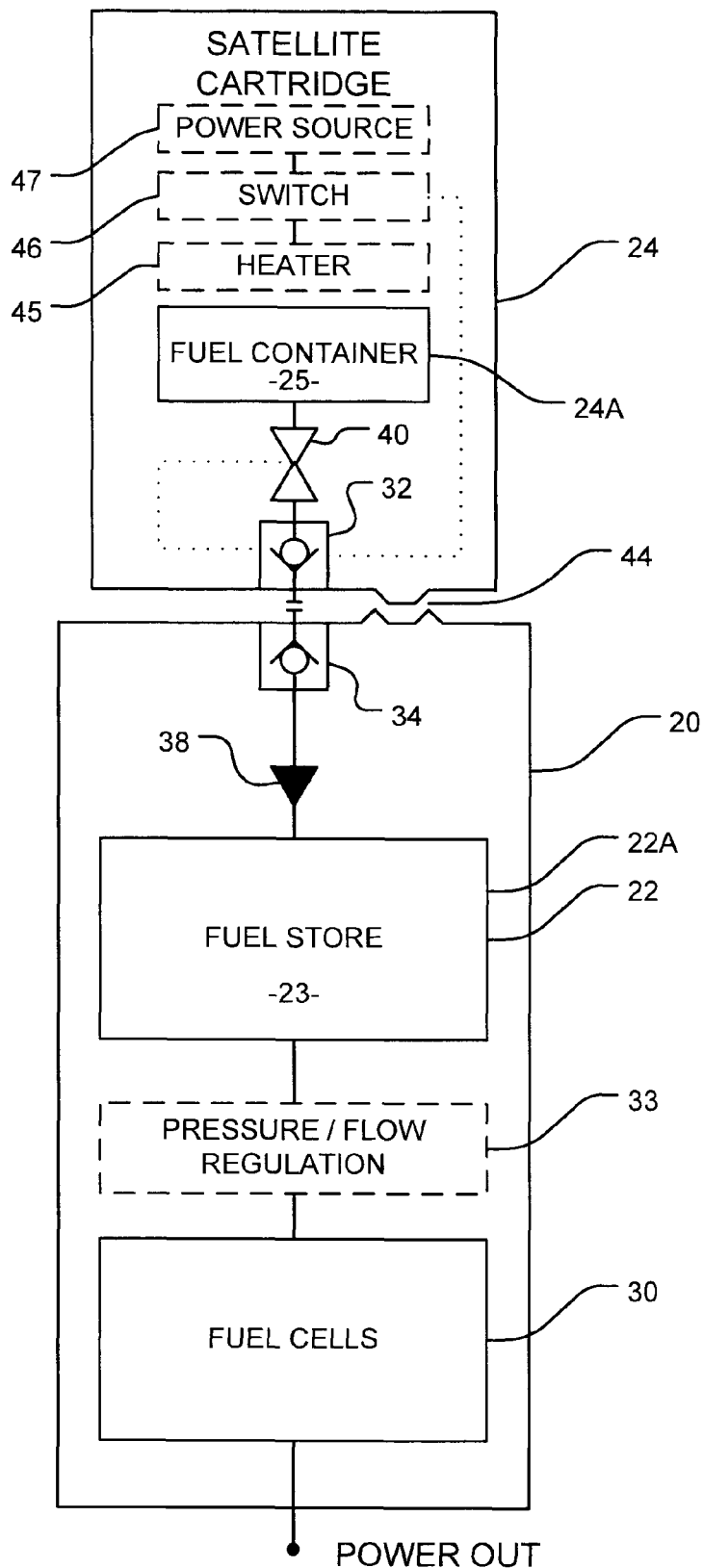
FIG. 6 is a schematic diagram of apparatus according to an example embodiment of the invention; and, FIG. 7 is a schematic diagram illustrating heat and hydrogen flow in an embodiment of the invention.

Heater 45 may be an electric heater. As illustrated in FIG. 6, heater 45 may, for example, be energized by electric power from a battery or other power source 47 associated with satellite cartridge 24 or with power drawn from portable device 20. A switch 46 may be provided to switch on heater 45 either manually or automatically upon connection of satellite cartridge 24 to hydrogen reservoir 22. If heater 45 is powered by electricity from portable device 20 then satellite cartridge 24 and portable device 20 may comprise complementary electrical power connectors that are coupled when fluid connector 32 is connected to port 34.

Many hydrogen-storing materials, such as reversible metal hydrides, release heat during hydrogen occlusion and absorb heat during hydrogen desorption. In small systems it is possible for this heat to be either absorbed from or discharged to the ambient environment surrounding the cartridge. This can be done by providing heat exchange surfaces that exchange heat with the surrounding environment. However, in such embodiments, the rate at which hydrogen can be transferred into the on-board hydrogen reservoir 22 is generally directly related to the rate at which the heat generated by the combination of hydrogen with first hydrogen-storing material 23 can be dissipated.

Figure 7:
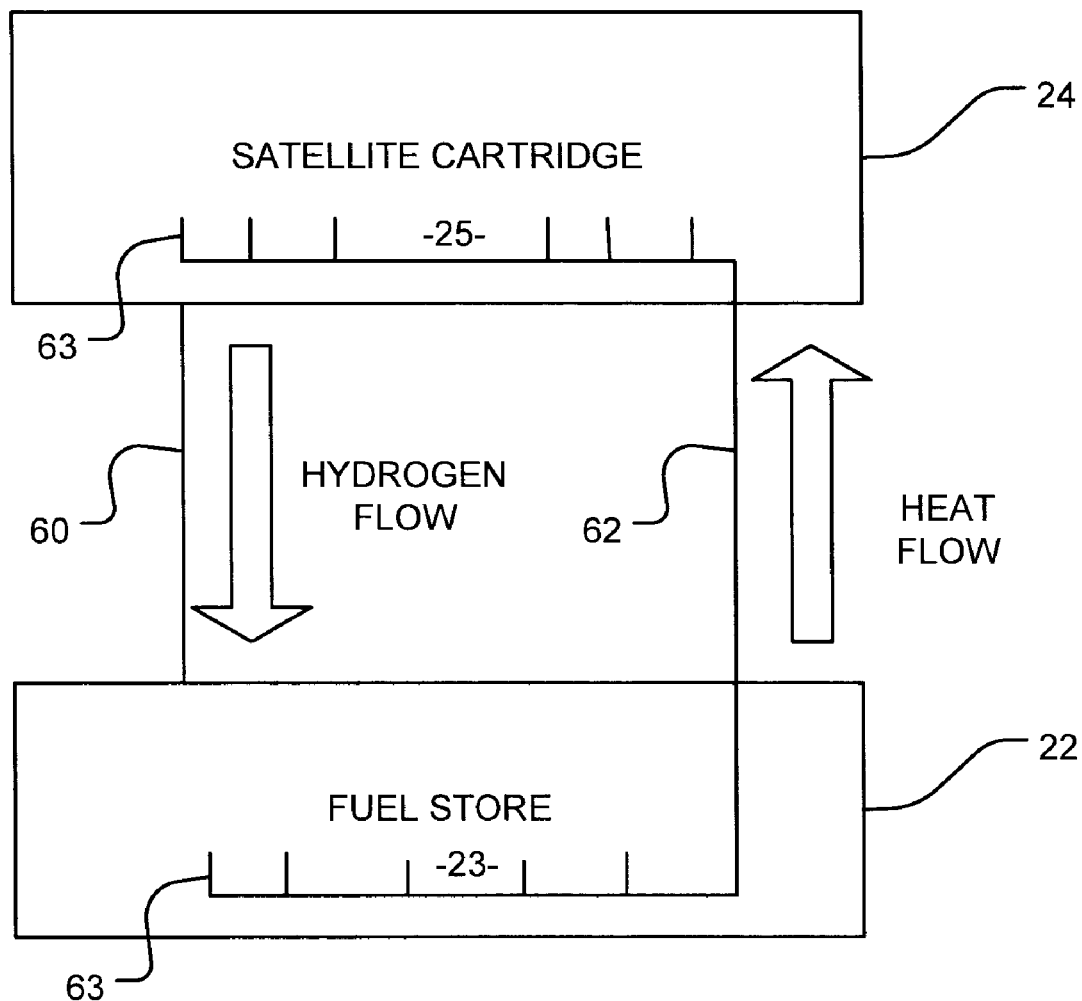

In some embodiments of the invention, a thermally conductive path is provided that links first and second hydrogen-storing materials 23 and 25 thermally. This is indicated schematically in FIG. 7, which shows a fluid connection 60 between satellite cartridge 24 and hydrogen reservoir 22 and a thermally-conductive path 62 extending between first and second hydrogen-storing materials 23 and 25. Heat can flow along this thermally-conductive pathway to facilitate desorption of hydrogen from second hydrogen-storing material 25 and absorption of hydrogen into first hydrogen-storing material 23. When hydrogen is being transferred along the thermally conductive path, heat is removed from first hydrogen-storing material 23 in portable device 20 and transferred to second hydrogen-storing material 25 in satellite cartridge 24. In this way, the heat generated by the occlusion of hydrogen in hydrogen reservoir 22 can be used to drive the desorption process in satellite cartridge 24.

The thermally-conductive path may be provided, for example, by making the connections between satellite cartridge 24, refueling port 34 and hydrogen reservoir 22 of thermally-conductive materials. In general, increasing the thermal conductivity of the thermally-conductive path increases the rate of heat transfer and reduces recharging time. An additional benefit of providing such a thermally-conductive path is that it cools hydrogen reservoir 22 and avoids or reduces unwanted heating of the components of portable electronic device 20.

Figure 5:
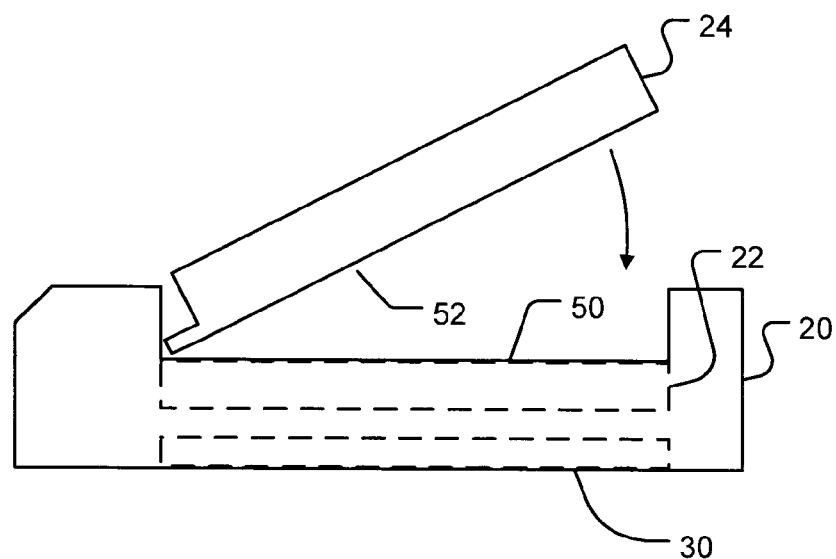
Figure 5A:
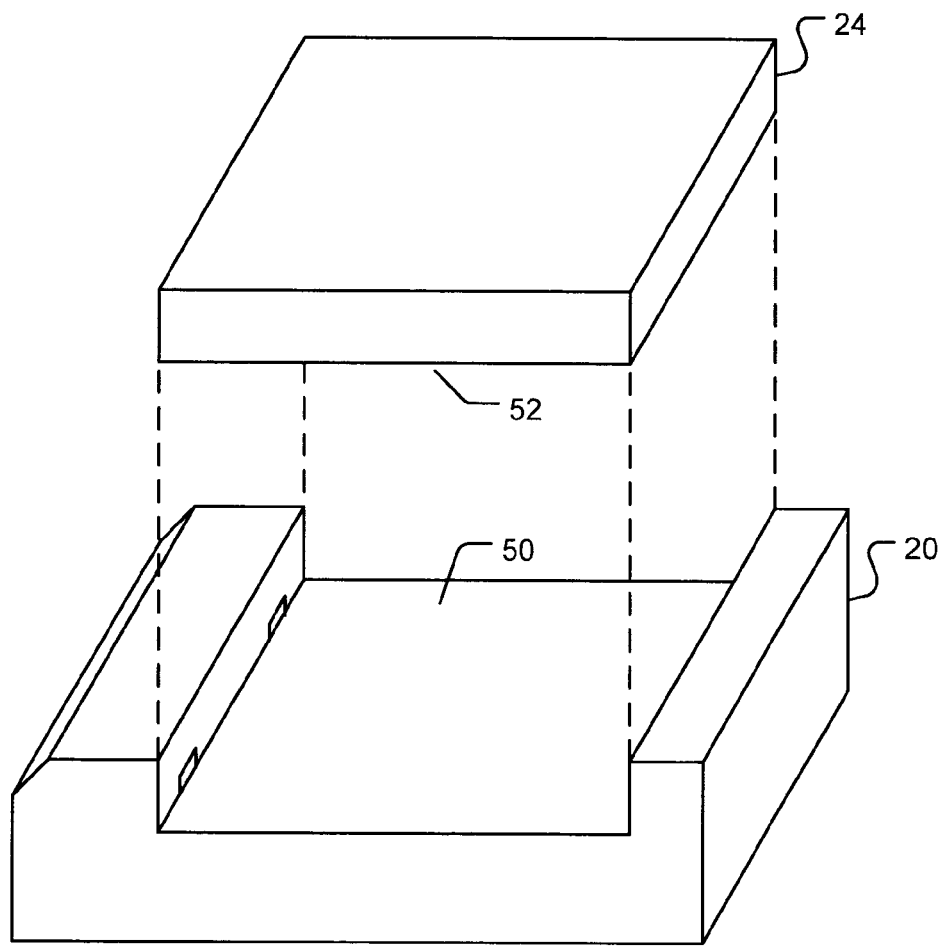

The physical configuration of portable device 20 and satellite cartridge 34 may be such that the thermally-conductive path has a large cross sectional area. FIGS. 5 and 5A illustrate an embodiment where a hydrogen reservoir 22 has a flattened configuration. A face of hydrogen reservoir 22 either forms an outer surface of portable device 20 or is in good thermal contact with a thermally-conductive outer wall of portable device 20 such that an exposed surface 50 of portable device 20 is in thermal contact with the first hydrogen-storing material 23 (not shown in FIG. 5) in hydrogen reservoir 22. Thermally-conductive baffles or the like 63 (FIG. 7) that are in thermal contact with first hydrogen-storing material 23 and exposed surface 50 may be provided within hydrogen reservoir 22. Such baffles may help to carry heat from first hydrogen-storing material 23 to exposed surface 50 during transfer of hydrogen into hydrogen reservoir 22 as well as support first hydrogen-storing material 23.

Satellite cartridge 24 also has a flattened configuration and has a face 52 that is in good thermal contact with second hydrogen-storing material 25 (not shown in FIG. 5). Thermally conductive baffles 63 or the like (FIG. 7) may be provided to carry heat from first hydrogen-storing material 23 via face 52 into second hydrogen-storing material 25.

When satellite cartridge 24 is connected to portable device 20, face 52 is in contact with surface 50. The thermal coupling between face 52 with surface 50 provides a thermally-conductive path 62 along which heat can flow readily between the first and second hydrogen-storing materials 23 and 25.

In the embodiment of FIGS. 5 and 5A, the fluid connection between satellite cartridge 24 and hydrogen reservoir 22 may be provided in any suitable manner. For example, mating fluid ports may be provided on surface 50 and face 52 or on an end of satellite cartridge 24 and a corresponding location on portable device 20.

It can be appreciated that the invention can be implemented in ways that provide safety characteristics that are enhanced relative to some other technologies. Cartridges that store compressed hydrogen at high pressures can be dangerous if their integrity is compromised or if they are overheated. By contrast, when a hydrogen-storing material such as a reversible metal hydride is used to store hydrogen in the satellite cartridge, the rate and pressure at which hydrogen can actually be released from the cartridge are inherently limited due to the physical nature of the material. This reduces the need for hydrogen reservoir 22 to be resistant to high pressures, limits the amount of free hydrogen available in the system at any one time, and increases the safety of the system in the event that the satellite cartridge is compromised, either intentionally or unintentionally.

In some embodiments, second hydrogen-storing material 25 in satellite cartridge 24 can be a material that would be less than optimum as a hydrogen-storing material in hydrogen reservoir 22. For instance, satellite cartridge 24 could be designed to be disposable, or only used a few times, and could contain an inexpensive metal hydride material that has a low cycle life, is not as volumetrically efficient as other more expensive materials.

In embodiments, second hydrogen-storing material 25 in satellite cartridge 24 could be used to purify hydrogen as well as a means for storing hydrogen. Second hydrogen-storing material 25 could initially be charged with hydrogen which contains impurities. Any impurities would tend to be left behind as the hydrogen combines with second hydrogen-storing material 25. Relatively pure hydrogen would be released from second hydrogen-storing material 25 when charging hydrogen reservoir 22. The impurities would limit the cycle life of the satellite cartridge; however, as mentioned above, cycle life is less critical in the case of a satellite cartridge than it is in the case of hydrogen reservoir 22. In this way, hydrogen which contains impurities (such as reformate) could effectively be scrubbed so as not to harm hydrogen reservoir 22.

Where a component (e.g. a fuel cell, seal, conduit, valve, assembly, device, circuit, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. For example:

The on-board hydrogen reservoir 22 is not necessarily permanently mounted within portable device 20. Hydrogen reservoir 22 may itself comprise a removable cartridge.

A fluid interconnect between a satellite cartridge and a hydrogen reservoir may be achieved in any suitable manner. Any suitable seals, such as o-rings, gaskets, adhesive seals, or other suitable seals may be provided to prevent hydrogen from leaking from the fluid connection between refueling port 34 and satellite cartridge 24.

It is therefore intended that the following appended claims and claims hereafter introduced are interpreted to include all such modifications, permutations, additions and sub-combinations as are within their true spirit and scope.

What is claimed is:

1. A method for transferring hydrogen fuel, the method comprising:
   providing a hydrogen reservoir comprising a first hydrogen-storing material with a charging pressure;
   providing a portable satellite cartridge containing a second hydrogen-storing material with a plateau pressure that is greater than the charging pressure of the first hydrogen-storing material;
   placing the satellite cartridge in fluid communication with the hydrogen reservoir; and,
   transferring hydrogen from the satellite cartridge into the hydrogen reservoir to charge the first hydrogen-storing material, wherein the pressure differential between the charging pressure of the first hydrogen-storing material and the plateau pressure of the second hydrogen-storing material facilitates the transfer of the hydrogen,
   wherein the first and second hydrogen-storing materials are different from one another.

2. A method according to claim 1 comprising thermally connecting the first and second hydrogen-storing materials and allowing heat to flow from the first hydrogen-storing material to the second hydrogen-storing material while allowing the hydrogen to flow from the satellite cartridge into the hydrogen reservoir.

3. A method according to claim 1 wherein providing the satellite cartridge containing the second hydrogen-storing material with the plateau pressure that is greater than the charging pressure of the first hydrogen-storing material comprises raising the plateau pressure of the second hydrogen-storing material by heating the second hydrogen-storing material.

4. A method according to claim 3 wherein heating the second hydrogen-storing material comprises passing an electrical current through the second hydrogen-storing material.

5. A method according to claim 3 wherein heating the second hydrogen-storing material comprises supplying hydrogen from the hydrogen reservoir to a fuel cell, generating electrical current at the fuel cell and passing the electrical current through an electrical heater in thermal contact with the second hydrogen-storing material.

6. A method according to claim 1 further comprising disconnecting the satellite cartridge from the hydrogen reservoir and delivering hydrogen from the hydrogen reservoir to a fuel cell at a plateau pressure of the first hydrogen-storing material.

7. A method according to claim 1 further comprising delivering hydrogen from the hydrogen reservoir to a fuel cell at a pressure that is lower than a plateau pressure of the first hydrogen-storing material.

8. A method according to claim 1 wherein placing the satellite cartridge in fluid communication with the hydrogen reservoir comprises making a fluid connection between a coupling on the satellite cartridge and a port in fluid communication with the hydrogen reservoir and opening a closure mechanism to allow the hydrogen to exit the satellite cartridge by way of the fluid connection.

9. A method according to claim 8 wherein making a fluid connection between a coupling on the satellite cartridge and a port in fluid communication with the hydrogen reservoir comprises engaging a thread of the coupling with a mating thread of the port.

10. A method according to claim 1 comprising supplying hydrogen from the hydrogen reservoir to a fuel cell while keeping the satellite cartridge in fluid communication with the hydrogen reservoir.

11. A method according to claim 10 comprising delivering hydrogen from the hydrogen reservoir to a fuel cell at a pressure that is lower than the plateau pressure of the second hydrogen-storing material.

12. A method according to claim 1 wherein, at an operating temperature, a plateau pressure of the first hydrogen-storing material is lower than a supply pressure required by the fuel cell and the plateau pressure of the second hydrogen-storing material is at least equal to the pressure required by the fuel cell.

13. A method according to claim 1 wherein, while allowing hydrogen to flow from the satellite cartridge into the hydrogen reservoir and combine with the first hydrogen-storing material, the hydrogen reservoir is on-board a portable device.

14. A method according to claim 1 comprising filling the satellite cartridge with hydrogen containing impurities and allowing the hydrogen to combine with the second hydrogen-storing material wherein the impurities remain on the second hydrogen-storing material when the hydrogen flows from the satellite cartridge into the hydrogen reservoir.

15. The method according to claim 1, wherein transferring stops when the charging pressure of the first hydrogen-storing material becomes about equal to the plateau pressure of the second hydrogen-storing material.

16. The method according to claim 1, wherein transferring stops when an equilibrium state is reached between a pressure in the satellite cartridge and a pressure in the hydrogen reservoir.

17. The method according to claim 15, wherein the plateau pressure of the second hydrogen-storing material becoming about equal to the charging pressure of the first hydrogen-storing material is caused by the first hydrogen-storing material being unable to further charge or by the second hydrogen-storing material being unable to further discharge.

18. A method for transferring hydrogen fuel, the method comprising:
providing a hydrogen reservoir comprising a first hydrogen-storing material with a charging pressure;
providing a portable satellite cartridge containing a second hydrogen-storing material with a plateau pressure that is greater than the charging pressure of the first hydrogen-storing material;
placing the satellite cartridge in fluid communication with the hydrogen reservoir; and,
transferring hydrogen from the satellite cartridge into the hydrogen reservoir to charge the first hydrogen-storing material, wherein the pressure differential between the charging pressure of the first hydrogen-storing material and the plateau pressure of the second hydrogen-storing material facilitates the transfer of the hydrogen;
wherein transferring stops when the charging pressure of the first hydrogen-storing material becomes about equal to the plateau pressure of the second hydrogen-storing material, or when an equilibrium state is reached between a pressure in the satellite cartridge and a pressure in the hydrogen reservoir,
wherein the first and second hydrogen-storing materials are different from one another.

19. A method for transferring hydrogen fuel, the method comprising:
providing a hydrogen reservoir comprising a first hydrogen-storing material with a charging pressure;
providing a portable satellite cartridge containing a second hydrogen-storing material with a discharge pressure that is greater than the charging pressure of the first hydrogen-storing material;
placing the satellite cartridge in fluid communication with the hydrogen reservoir; and,
transferring hydrogen from the satellite cartridge into the hydrogen reservoir to charge the first hydrogen-storing material, wherein the pressure differential between the charging pressure of the first hydrogen-storing material and the discharge pressure of the second hydrogen-storing material causes the transfer of the hydrogen,
wherein the first and second hydrogen-storing materials are different from one another.

* * * * *